(12) United States Patent
Sokolov et al.

(10) Patent No.: US 10,200,359 B1
(45) Date of Patent: Feb. 5, 2019

(54) SYSTEMS AND METHODS FOR CREATING CREDENTIAL VAULTS THAT USE MULTI-FACTOR AUTHENTICATION TO AUTOMATICALLY AUTHENTICATE USERS TO ONLINE SERVICES

(71) Applicant: Symantec Corporation, Mountain View, CA (US)

(72) Inventors: Ilya Sokolov, Boston, MA (US); Kevin Jiang, Waltham, MA (US)

(73) Assignee: Symantec Corporation, Mountain View, CA (US)

( * ) Notice: Subject to any disclaimer, the term of this patent is extended or adjusted under 35 U.S.C. 154(b) by 13 days.

(21) Appl. No.: 14/754,737

(22) Filed: Jun. 30, 2015

(51) Int. Cl.
*H04L 29/06* (2006.01)
*H04L 29/08* (2006.01)

(52) U.S. Cl.
CPC ............ *H04L 63/083* (2013.01); *H04L 67/02* (2013.01); *H04L 67/10* (2013.01)

(58) Field of Classification Search
CPC ........ H04L 63/083; H04L 67/02; H04L 67/10
See application file for complete search history.

(56) References Cited

U.S. PATENT DOCUMENTS

| 9,380,523 | B1* | 6/2016 | Mijar | H04W 48/18 |
| 2003/0115453 | A1* | 6/2003 | Grawrock | G06F 21/57 |
| | | | | 713/155 |
| 2005/0246193 | A1* | 11/2005 | Roever | G06Q 30/06 |
| | | | | 705/35 |
| 2006/0269061 | A1* | 11/2006 | Balasubramanian | |
| | | | | C07D 209/88 |
| | | | | 380/247 |
| 2008/0276098 | A1 | 11/2008 | Florencio et al. | |
| 2008/0313707 | A1* | 12/2008 | Jain | H04L 63/08 |
| | | | | 726/2 |

(Continued)

OTHER PUBLICATIONS

Basney et al., Integrating Science Gateways with XSEDE Security: A Survey of Credential Management Approaches, ACM, Jul. 2014, XSEDE '14: Proceedings of the 2014 Annual Conference on Extreme Science and Engineering Discovery Environment (Year: 2014).*

(Continued)

*Primary Examiner* — Luu T Pham
*Assistant Examiner* — Harvey I Cohen
(74) *Attorney, Agent, or Firm* — FisherBroyles, LLP

(57) ABSTRACT

The disclosed method for creating credential vaults that use multi-factor authentication to automatically authenticate users to online services may include (1) detecting a user account for an online service that uses multi-factor authentication comprising a token that generates a cryptographic authentication code, (2) creating a virtual representation of the token that is capable of generating the cryptographic authentication code, (3) storing the virtual representation of the token and a set of credentials for the user account in a credential vault for a user, (4) sending a message to the online service that associates the virtual representation of the token with the user account, (5) authenticating the user to the credential vault, and (6) automating the multi-factor authentication process for the online service by providing the cryptographic authentication code and the set of credentials to the online service. Various other methods, systems, and computer-readable media are also disclosed.

20 Claims, 7 Drawing Sheets

(56) References Cited

U.S. PATENT DOCUMENTS

| | | | |
|---|---|---|---|
| 2009/0132813 A1* | 5/2009 | Schibuk | G06Q 20/223 713/158 |
| 2009/0249076 A1 | 10/2009 | Reed et al. | |
| 2010/0100945 A1* | 4/2010 | Ozzie | G06F 21/35 726/5 |
| 2010/0107229 A1* | 4/2010 | Najafi | G06F 21/35 726/6 |
| 2010/0162377 A1 | 6/2010 | Gonzalez et al. | |
| 2012/0150669 A1* | 6/2012 | Langley | G06Q 30/0601 705/16 |
| 2012/0278241 A1 | 11/2012 | Brown et al. | |
| 2013/0185779 A1 | 7/2013 | Tamai et al. | |
| 2014/0012701 A1* | 1/2014 | Wall | G06Q 20/383 705/26.8 |
| 2014/0157381 A1 | 6/2014 | Disraeli | |
| 2015/0046989 A1* | 2/2015 | Oberheide | G06F 21/44 726/6 |
| 2015/0172292 A1 | 6/2015 | Kuang et al. | |
| 2017/0063857 A1 | 3/2017 | Rykowski et al. | |
| 2017/0169422 A1* | 6/2017 | Ye | G09C 1/00 |

OTHER PUBLICATIONS

Hayashi et al., Knock x knock: the design and evaluation of a unified authentication authentication management system, Sep. 2015 UbiComp '15: Proceedings of the 2015 ACM International Joint Conference on Pervasive and Ubiquitous Computing (Year: 2015).*

Steffen et al., Using the mobile phone as a security token for unified authentication, IEEE, 2007 Second International Conference on Systems and Networks Communications (ICSNC 2007), p. 68 (Year: 2007).*

Kevin Jiang, et al; Systems and Methods for Registering User Accounts with Multi-Factor Authentication Schemes Used by Online Services; U.S. Appl. No. 14/848,958, filed Sep. 9, 2015.

"LastPass", https://lastpass.com/, as accessed Jul. 24, 2015, (Apr. 14, 2003).

Gott, Amber, "Introducing Auto-Password Changing with LastPass", https://blog.lastpass.com/2014/12/introducing-auto-password-changing-with.html/, as accessed Jul. 24, 2015, (Dec. 9, 2014).

"Multifactor authentication (MFA) definition", http://searchsecurity.techtarget.com/definition/multifactor-authentication-MFA, as accessed Jul. 24, 2015, TechTarget, (Apr. 14, 2011).

M'Raihi, D. et al., "TOTP: Time-Based One-Time Password Algorithm", http://tools.ietf.org/html/rfc6238, as accessed Apr. 20, 2015, Request for Comments: 6238, (May 2011).

"Authy", https://www.authy.com/, as accessed Apr. 20, 2015, (Nov. 20, 2011).

"Norton", https://login.norton.com, as accessed Apr. 20, 2015, Symantec Corporation, (On or before Apr. 20, 2015).

"Time-based One-time Password Algorithm", https://en.wikipedia.org/wiki/Time-based_One-time_Password_Algorithm, as accessed Apr. 20, 2015, Wikipedia, (Jul. 18, 2010).

"Google Authenticator", https://support.google.com/accounts/answer/1066447?hl=en, as accessed Apr. 20, 2015, (May 26, 2013).

Scott Schneider, et al; Systems and Methods for Enabling Biometric Authentication Options; U.S. Appl. No. 14/178,276, filed Feb. 12, 2014.

* cited by examiner

SYSTEMS AND METHODS FOR CREATING CREDENTIAL VAULTS THAT USE MULTI-FACTOR AUTHENTICATION TO AUTOMATICALLY AUTHENTICATE USERS TO ONLINE SERVICES

BACKGROUND

Security is often described as a continuum between convenience and safety. A system that requires ten layers of authentication may be very difficult to attack, but it may also be so inconvenient that it will never be used. At the opposite end, a system with no means of authentication or authorization is highly convenient for users but also highly insecure. A growing number of online services now use multi-factor authentication (MFA) systems that involve some combination of a username or email address, a password, and a cryptographic authentication code generated by an additional device owned by the user. Keeping track of a physical device and/or a special application for each online service may be frustrating for users. Frustration often leads to poor security measures, such as password re-use and storing physical tokens in insecure areas. A growing number of users are avoiding the hazards of password re-use and the difficulties of keeping track of a large number of passwords by using password managers or credential vaults.

Many traditional systems for credential vaults are only capable of storing a username and password for each online service and may not be able to store or otherwise access the token that generates the cryptographic authentication code. These traditional systems may not be able to fully automate the login process of online services that use MFA. Accordingly, the instant disclosure identifies and addresses a need for additional and improved systems and methods for creating credential vaults that use multi-factor authentication to automatically authenticate users to online services.

SUMMARY

As will be described in greater detail below, the instant disclosure describes various systems and methods for creating credential vaults that use multi-factor authentication to automatically authenticate users to online services by creating virtual representations of tokens and associating them with sets of credentials and user accounts for various online services, then automatically authenticating the user to any of the online services once the user has authenticated to the credential vault, allowing the user to authenticate to multiple online services via a single sign-on process.

In one example, a computer-implemented method for creating credential vaults that automatically authenticate users to online services may include (1) detecting a user account for an online service that uses multi-factor authentication including a token that generates a cryptographic authentication code, (2) creating a virtual representation of the token that is capable of generating the cryptographic authentication code for the multi-factor authentication, (3) storing the virtual representation of the token and a set of credentials for the user account in a credential vault for a user, (4) sending a message to the online service that associates the virtual representation of the token with the user account, (5) authenticating the user to the credential vault, and (6) automating, based on the user being authenticated to the credential vault, the multi-factor authentication process for the online service by providing the cryptographic authentication code generated by the virtual representation of the token and the set of credentials to the online service from the credential vault.

In some examples, the token may include a physical device. In other examples, the token may include an application designed to be executed on a mobile device.

In one embodiment, the credential vault may be configured to store sets of credentials and virtual representations of tokens for a variety of online services. In one example, the computer-implemented method may further include (1) detecting an additional user account for an additional online service that uses an additional multi-factor authentication process including an additional token that generates an additional cryptographic authentication code, (2) creating an additional virtual representation of the additional token that is capable of generating the additional cryptographic authentication code for the additional multi-factor authentication process, (3) storing the additional virtual representation of the additional token and an additional set of credentials for the additional user account in the credential vault for the user, (4) sending an additional message to the additional online service that associates the additional virtual representation of the additional token with the additional user account, and (5) automating, based on the user being authenticated to the credential vault, the additional multi-factor authentication process for the additional online service by providing the additional cryptographic authentication code generated by the additional virtual representation of the token and the additional set of credentials to the additional online service from the credential vault. In some examples, the credential vault may be stored on a remote server accessible from a number of computing devices operated by the user.

In some embodiments, authenticating the user to the credential vault may include authenticating the user to the credential vault via MFA. In some examples, providing the online service with the cryptographic authentication code generated by the virtual representation of the token and the set of credentials may include automatically populating form fields on a website that uses the online service with the cryptographic authentication code and the set of credentials. In one embodiment, the online service may include a secure login service for multiple websites.

In one embodiment, a system for implementing the above-described method may include (1) a detection module, stored in memory, that detects a user account for an online service that uses multi-factor authentication including a token that generates a cryptographic authentication code, (2) a creation module, stored in memory, that creates a virtual representation of the token that is capable of generating the cryptographic authentication code for the multi-factor authentication, (3) a storing module, stored in memory, that stores the virtual representation of the token and a set of credentials for the user account in a credential vault for a user, (4) a sending module, stored in memory, that sends a message to the online service that associates the virtual representation of the token with the user account, (5) an authentication module, stored in memory, that authenticates the user to the credential vault, (6) an automation module, stored in memory, that automates, based on the user being authenticated to the credential vault, the multi-factor authentication process for the online service by providing the cryptographic authentication code generated by the virtual representation of the token and the set of credentials to the online service from the credential vault, and (7) at least one physical processor configured to execute the detection module, the creation module, the storing module, the sending module, the authentication module, and the automation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect a user account for an online service that uses multi-factor authentication including a token that generates a cryptographic authentication code, (2) create a virtual representation of the token that is capable of generating the cryptographic authentication code for the multi-factor authentication, (3) store the virtual representation of the token and a set of credentials for the user account in a credential vault for a user, (4) send a message to the online service that associates the virtual representation of the token with the user account, (5) authenticate the user to the credential vault, and (6) automate, based on the user being authenticated to the credential vault, the multi-factor authentication process for the online service by providing the cryptographic authentication code generated by the virtual representation of the token and the set of credentials to the online service from the credential vault.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
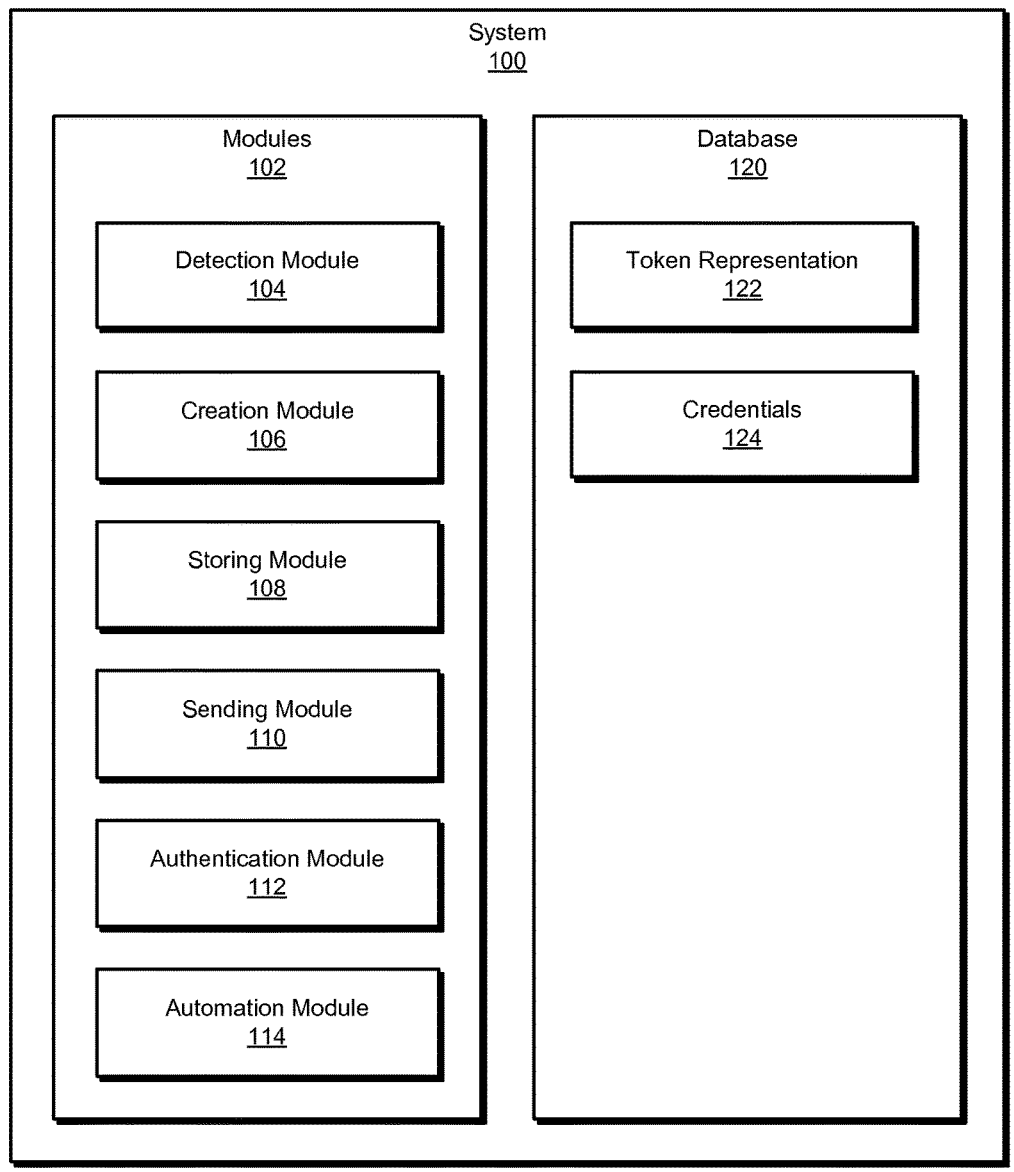
FIG. 1 is a block diagram of an exemplary system for creating credential vaults that use multi-factor authentication to automatically authenticate users to online services.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for creating credential vaults that use multi-factor authentication to automatically authenticate users to online services. As will be explained in greater detail below, by storing virtual representations of cryptographic-code-generation tokens along with credentials for online accounts, the systems described herein may enable users to securely and conveniently log on to many online services from a variety of devices via a single sign-on process.

The following will provide, with reference to FIGS. 1, 2, 4, and 5, detailed descriptions of exemplary systems for creating credential vaults that use multi-factor authentication to automatically authenticate users to online services. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for creating credential vaults that use MFA to automatically authenticate users to online services. As illustrated in this figure, exemplary system 100 may include one or more modules 102 for performing one or more tasks. For example, and as will be explained in greater detail below, exemplary system 100 may include a detection module 104 that detects a user account for an online service that uses MFA. In this embodiment, the MFA process may include a token that generates a cryptographic authentication code. Exemplary system 100 may additionally include a creation module 106 that creates a virtual representation of the token that is capable of generating the cryptographic authentication code for the MFA. Exemplary system 100 may also include a storing module 108 that stores the virtual representation of the token and a set of credentials for the user account in a credential vault for a user. Exemplary system 100 may additionally include a sending module 110 that sends a message to the online service that associates the virtual representation of the token with the user account.

Exemplary system 100 may also include an authentication module 112 that authenticates the user to the credential vault. Exemplary system 100 may additionally include an automation module 114 that automates, based on the user being authenticated to the credential vault, the MFA process for the online service by providing the cryptographic authentication code generated by the virtual representation of the token and the set of credentials to the online service from the credential vault. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store virtual representations of tokens and/or sets of credentials.

Database 120 may represent portions of a single database or computing device or a plurality of databases or computing devices. For example, database 120 may represent a portion of server computing system 610 in FIG. 6 and/or portions of exemplary network architecture 700 in FIG. 7. Alternatively, database 120 in FIG. 1 may represent one or more physically separate devices capable of being accessed by a computing device, such as computing system 610 in FIG. 6 and/or portions of exemplary network architecture 700 in FIG. 7.

Figure 2:
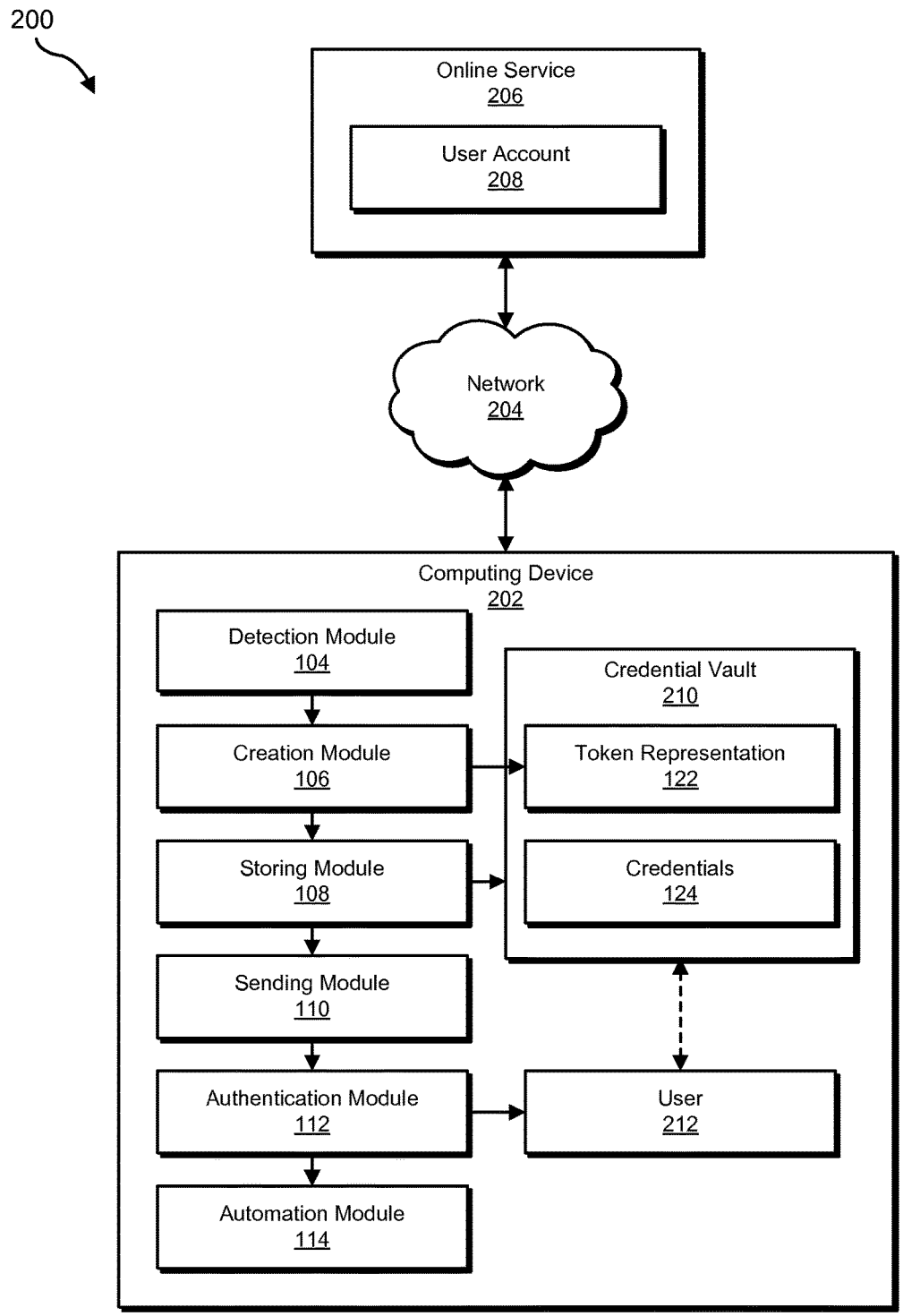
FIG. 2 is a block diagram of an additional exemplary system for creating credential vaults that use multi-factor authentication to automatically authenticate users to online services.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with an online service 206 via a network 204. In one example, computing device 202 may be programmed with one or more of modules 102 and/or may store all or a portion of the data in database 120.

In one embodiment, one or more of modules 102 from FIG. 1 may, when executed by at least one processor of computing device 202, enable computing device 202 to create credential vaults that use MFA to automatically authenticate users to online services. For example, and as will be described in greater detail below, detection module 104 may detect a user account 208 for online service 206 that uses an MFA process that includes a token that generates a cryptographic authentication code. Creation module 106 may create a token representation 122 that is capable of generating the cryptographic authentication code for the MFA. Next, storing module 108 may store token representation 122 and credentials 124 for user account 208 in a credential vault 210 for a user 212. Once credential vault 210 is prepared, sending module 110 may send a message to online service 206 that associates token representation 122 with user 212 account.

At some later time, authentication module 112 may authenticate user 212 to credential vault 210. Finally, automation module 114 may automate, based on user 212 being authenticated to credential vault 210, the MFA process for online service 206 by providing the cryptographic authentication code generated by token representation 122 and credentials 124 to online service 206 from credential vault 210.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and online service 206.

Figure 3:
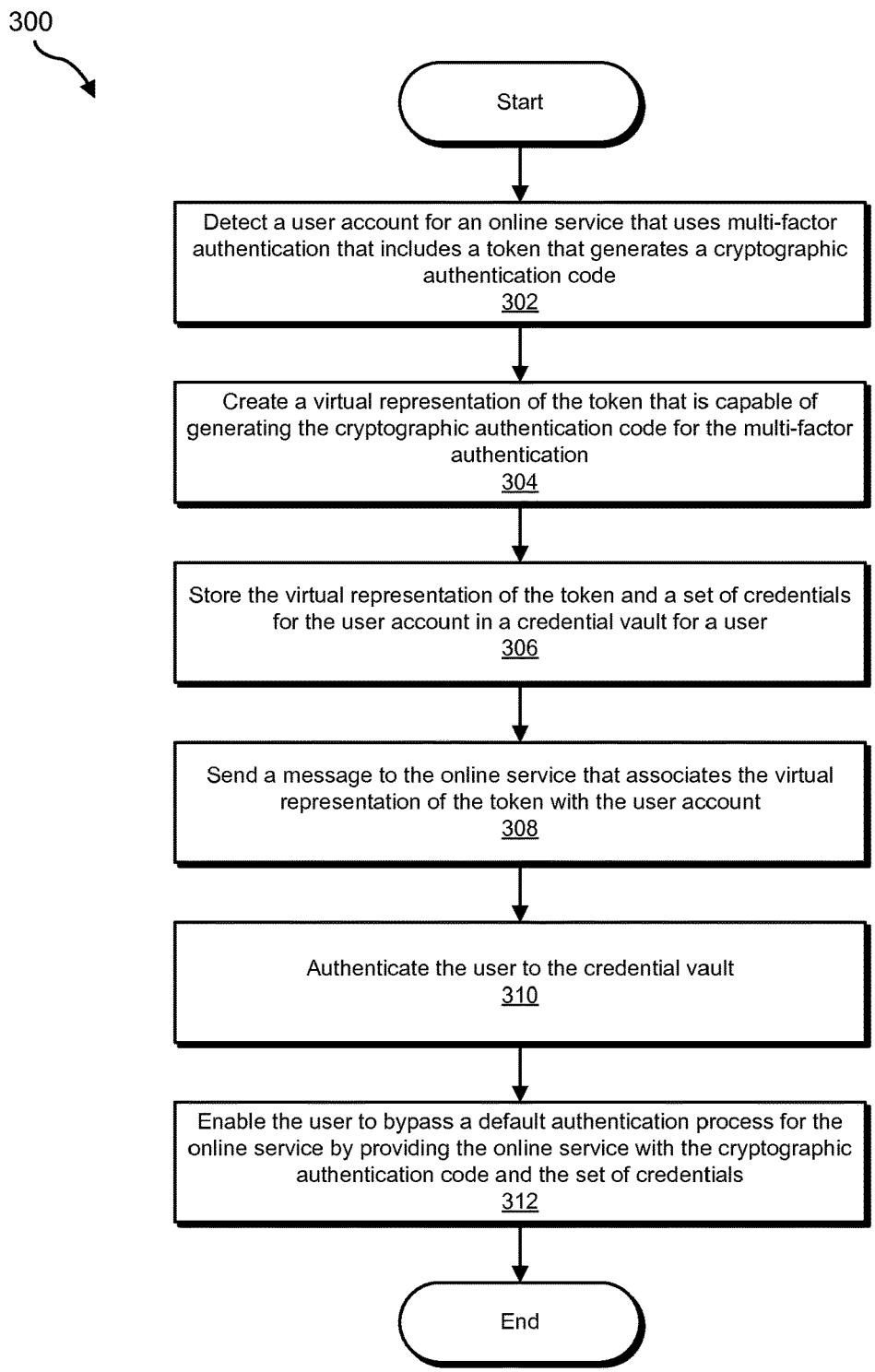
FIG. 3 is a flow diagram of an exemplary method for creating credential vaults that use multi-factor authentication to automatically authenticate users to online services.

FIG. 3 is a flow diagram of an exemplary computer-implemented method 300 for creating credential vaults that use multi-factor authentication to automatically authenticate users to online services. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may detect a user account for an online service that uses an MFA process that includes a token that generates a cryptographic authentication code. For example, detection module 104 may, as part of computing device 202 in FIG. 2, detect user account 208 for online service 206 that uses an MFA process that includes a token that generates a cryptographic authentication code.

The term "online service," as used herein, generally refers to any website and/or service that is provided via the Internet. Examples of an online service may include, without limitation, a social networking platform, an e-mail service, a chat service, a forum, a retail website, an online game, a financial website, and/or a docketing service. In one embodiment, the online service may include a secure login service for multiple websites. For example, a NORTON SECURE LOGIN account may allow a user access to a variety of different websites that use the NORTON SECURE LOGIN platform.

The term "user account," as used herein, generally refers to any representation of a user to one or more online services. In some embodiments, a user account may be protected by MFA to prevent unauthorized users from accessing the account. In some examples, a user account may be associated with a single online service. In other examples, a single user account may be associated with multiple online services. For example, a user may use their GOOGLE account to log in to a variety of online services that are partnered with GOOGLE.

The term "multi-factor authentication," or, "MFA," as used herein, generally refers to any type of authentication process that requires more than one factor. In many embodiments, one or more of the additional factors may involve a token. The term "token," as used herein, generally refers to any device and/or application that can create and/or display a cryptographic authentication code. For example, an MFA process may require an email address, a password, and a code sent via text message to a mobile phone. In this example, the mobile device may be the token. In another example, an MFA process may require a username, a password, and a code generated by an RSA SECURID device. In this example, the RSA SECURID device may be the token. Additionally or alternatively, an MFA process may require a code generated by a specially designed application on a smartphone or other device. In this example, the application may be the token. Additional examples of a token may include, without limitation, VIP software tokens, AUTHY tokens, and/or GOOGLE AUTHENTICATOR tokens.

The term "cryptographic authentication code," as used herein, generally refers to any data generated using the shared secret of a cryptographic algorithm that may be verified by another system that possesses the shared secret. In some examples, the cryptographic authentication code may include an alphanumeric string. In some embodiments, the cryptographic authentication code may be a one-time password that is generated using the shared secret and the current time.

Detection module 104 may detect the user account in a variety of ways. For example, detection module 104 may crawl websites that a user views for indications that the user is setting up an account that uses MFA. In another example, detection module 104 may receive input from the user that the user has created or is in the process of creating a user account that uses MFA. Additionally or alternatively, detection module 104 may receive input from the online service that the user is setting up an account that uses MFA.

At step 304, one or more of the systems described herein may create a virtual representation of the token that is capable of generating the cryptographic authentication code for the MFA. For example, creation module 106 may, as part of computing device 202 in FIG. 2, create a token representation 122 that is capable of generating the cryptographic authentication code for the MFA.

The term "virtual representation of the token," or "token representation," as used herein, generally refers to any code, script, module, application, or other software that is not necessarily the token provided by a particular online service but that is capable of generating a cryptographic authentication code that is indistinguishable from a cryptographic authentication code generated by the expected token. For example, a virtual representation of a token may include an algorithm that applies a shared secret to the current timestamp to generate a cryptographic authentication code that is indistinguishable from a cryptographic authentication code generated by a physical token, such as an RSA SECURID DEVICE, an IRONKEY TRUSTED ACCESS FOR BANKING, and/or a VASCO DIGIPASS GO. In another example, a virtual representation of a token may include a virtual machine running an application that is designed to execute on a mobile device and generate cryptographic authentication tokens.

Creation module 106 may create the virtual representation of the token in a variety of ways. For example, creation module 106 may include a selection of premade virtual tokens that are appropriate representations of common types of tokens, such as mobile applications and/or physical tokens. In another example, creation module 106 may create a virtual machine to host the token, such as a virtual mobile device that is capable of hosting a cryptographic code generation application and/or receiving a text message. Additionally or alternatively, creation module 106 may query the online service to determine what type of token the online service is expecting and/or may create a custom virtual token for the online service. For example, the online service may expect a mobile application that uses a shared secret to generate a cryptographic code and creation module 106 may create a virtual token that contains the shared secret. In some embodiments, creation module 106 may allocate tokens on demand in response to detection module 104 detecting MFA systems for online accounts.

At step 306, one or more of the systems described herein may store the virtual representation of the token and a set of credentials for the user account in a credential vault for a user. For example, storing module 108 may, as part of computing device 202 in FIG. 2, store token representation 122 and a credentials 124 for user account 208 in credential vault 210 for user 212.

The term "credential vault," as used herein, generally refers to any service and/or storage medium capable of storing credentials for one or more online services. In some embodiments, a credential vault may function as an account manager. In some examples, a credential vault may store usernames, passwords, security question answers, domains of online services, user account details, and/or virtual representations of tokens for online services. In some embodiments, some or all of the systems described herein may be part of a credential vault.

Storing module 108 may store the virtual representation of the token and the credentials in the credential vault in a variety of ways and/or contexts. For example, storing module 108 may store the token representation and the credentials in a credential vault on a local device. In another embodiment, storing module 108 may store the token representation and the credentials in a credential vault that is hosted on a remote server accessible from a variety of computing devices operated by the user.

In some examples, storing module 108 may receive input directly from the user specifying the credentials to associate with the online service. In other examples, storing module 108 may store the credentials by capturing the credentials while the credentials are being entered into the online service. Additionally or alternatively, storing module 108 may generate some portion of the credentials for the user account for the online service. For example, storing module 108 may include a secure password generator that may generate difficult-to-break passwords for online services.

At step 308, one or more of the systems described herein may send a message to the online service that associates the virtual representation of the token with the user account. For example, sending module 110 may, as part of computing device 202 in FIG. 2, send a message to online service 206 that associates token representation 122 with user account 208.

The term "message," as used herein, generally refers to any data sent electronically from one application and/or device to another application and/or device. In some embodiments, sending module 110 may send a message that appears to be from the token expected by the online service. For example, sending module 110 may send a message that appears to come from an authentication application running on a mobile device. In another example, sending module 110 may send a message using a user interface of the online service. For example, sending module 110 may populate a form field for "mobile phone number" with a fake phone number that connects to the virtual representation of the token.

At step 310, one or more of the systems described herein may authenticate the user to the credential vault. For example, authentication module 112 may, as part of computing device 202 in FIG. 2, authenticate user 212 to credential vault 210.

Authentication module 112 may authenticate the user in a variety of ways. In some examples, authentication module 112 may authenticate the user to the credential vault by authenticating the user via an MFA scheme. For example, authentication module 112 may request a username, password, a form of biometric authentication, and/or a cryptographic code from the user.

In some examples, authentication module 112 may authenticate a user on multiple devices. For example, authentication module 112 may authenticate a user to the credential vault on their laptop, their smartphone, and/or their tablet. In this example, the user may then be able to access the credential vault from any of the devices on which they are authenticated.

At step 312, one or more of the systems described herein may automate, based on the user being authenticated to the credential vault, the MFA process for the online service by providing the cryptographic authentication code generated by the virtual representation of the token and the set of credentials to the online service from the credential vault. For example, automation module 114 may, as part of computing device 202 in FIG. 2, automate, based on user 212 being authenticated to credential vault 210, the MFA process for online service 206 by providing the cryptographic authentication code generated by token representation 122 and credentials 124 to online service 206 from credential vault 210.

Automation module 114 may automate the MFA process in a variety of ways. As part of the authentication process, automation module 114 may automatically, without user intervention, generate the cryptographic authentication code at the time automation module 114 is attempting to complete the MFA process (i.e., in real time). Automation module 114 may automatically populate form fields on a website that uses the online service with the cryptographic authentication code and the set of credentials. In some examples, automation module 114 may also automate clicks on login buttons so that the login process does not involve the user's input at all. In other examples, automation module 114 may populate form fields but may leave it to the user to click any buttons involved in the login process. In some embodiments, automation module 114 may send the credentials and/or the cryptographic authentication code directly to the online service, for example via an application programming interface (API).

As used herein, the term "automate" generally refers to any computer-implemented process performed without some or all user intervention and/or assistance. Thus, an automated process may be performed completely without user intervention or may perform at least a portion of the tasks typically performed manually.

Figure 4:
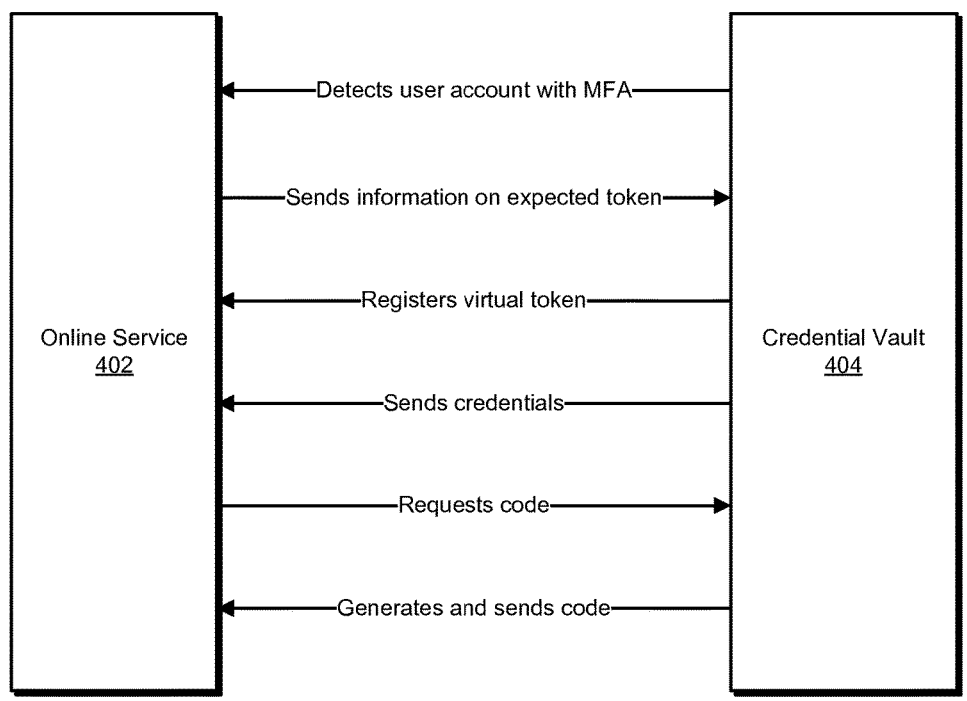
FIG. 4 is a block diagram of an exemplary computing system for creating credential vaults that use multi-factor authentication to automatically authenticate users to online services.

In some examples, the systems described herein may automate the login process by communicating the online service at several different stages. As illustrated in FIG. 4, a system 400 may include an online service 402 in communication with a credential vault 404. First, credential vault 404 may detect that online service 402 offers and/or requires MFA for a user account created by the user. As part of this detection process, credential vault 404 may gather and/or request information about the type of token expected by online service 402. Online service 402 may then send information on the expected token to credential vault 404. Credential vault 404 may create a virtual representation of the token and may register this token with online service 402. Either at the same time or in a separate communication, credential vault 404 may send credentials for the user account to online service 402. Later, the user may attempt to login to their account on online service 402. At this time, online service 402 may request the code from the virtual token, for example by sending a message to the token and/or by displaying a form field. In response, credential vault 404 may generate and send the code to online service 402. Credential vault 404 may also send the credentials and/or may automate other parts of the login process.

Figure 5:
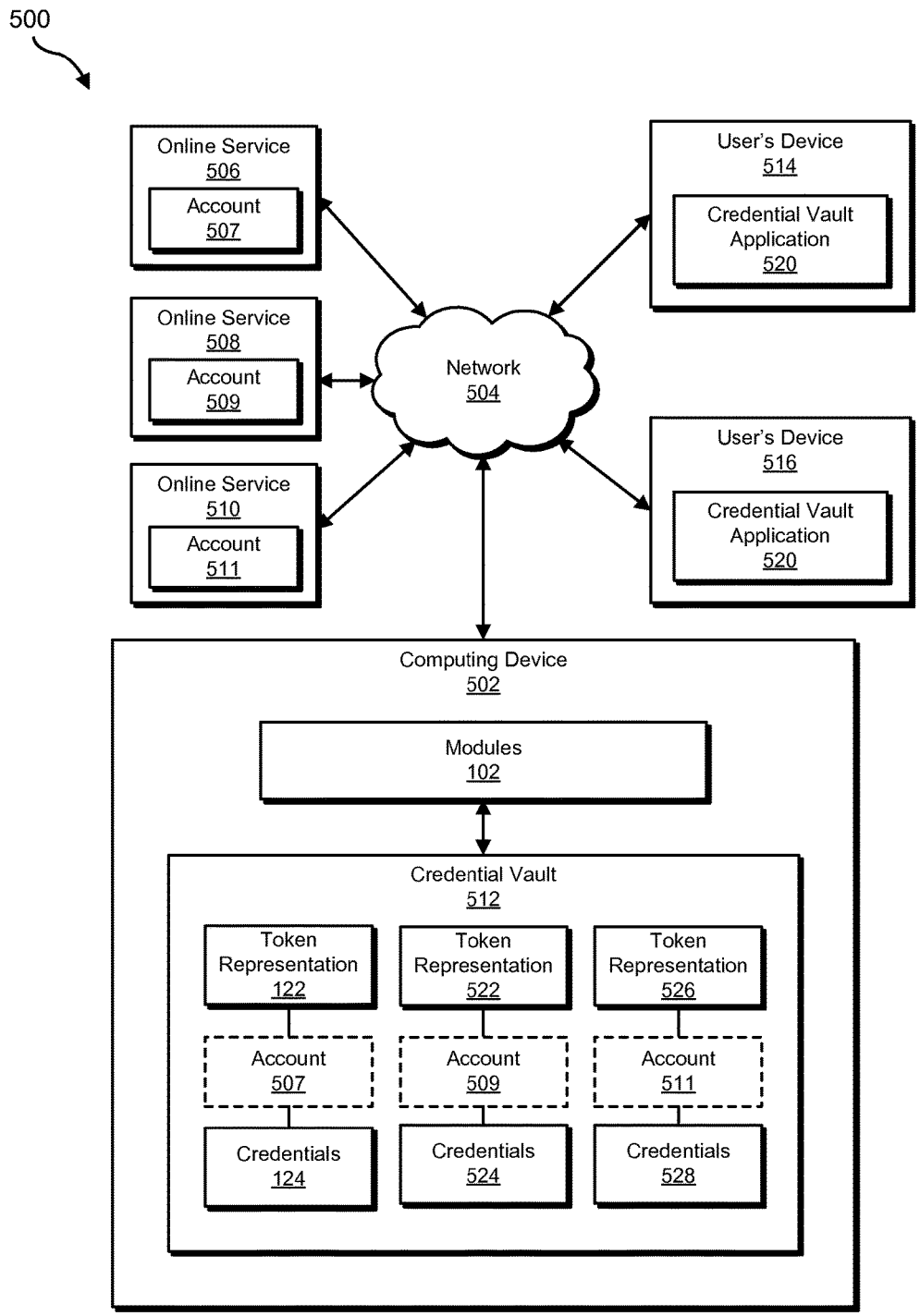
FIG. 5 is a block diagram of an exemplary computing system for creating credential vaults that use multi-factor authentication to automatically authenticate users to online services.

In one embodiment, the credential vault may be configured to store various sets of credentials and virtual representations of tokens for a number of online services. In some examples, the systems described herein may go through the process described above for multiple different online services, but may require the user to authenticate to the credential vault only once. As illustrated in FIG. 5, a system 500 may include a computing device 502 in communication with online services 506, 508, and/or 510, and/or user's devices 514 and/or 516. Computing device 502 may include modules 102 and/or a credential vault 512. In some embodiments, computing device 502 may represent a cloud server that hosts multiple instances of credential vaults for multiple users.

In some examples, credential vault 512 may include token representation 122 and credentials 124 for account 507, token representation 522 and credentials 524 for account 509, and/or token representation 526 and credentials 528 for account 511. Accounts 507, 509, and/or 511 may be user accounts for online services 506, 508, and/or 510, respectively. By authenticating to credential vault 512, a user may be automatically authenticated to online services 506, 508, and/or 510 without having to perform further authentication steps with respect to either the online services or the credential vault.

In some examples, a user may use multiple devices that are configured with an application that lets the user access the credential vault. For example, user's device 514 and user's device 516 may both be configured with credential vault application 520. A user may authenticate to credential vault application 520 and the systems described herein may then automatically authenticate the user to any of their online services, such as online services 508, 508, and/or 510, on device 514 and/or device 516.

As explained in connection with method 300 above, the systems described herein may allow a user to login to a cloud-synchronized credential vault that stores details about and credentials for multiple online accounts. The credential vault may store session information for online services, pre-populate usernames and passwords in form fields, generate and pre-populate fields with one time passwords or other cryptographic codes, and/or automatically submit login forms. The systems described herein may thus enable single sign-on for online services with MFA. Furthermore, the systems described herein may synchronize across multiple devices operated by a user, allowing the user to seamlessly login to various online services on any device. In this way, the systems described herein may greatly increase user convenience without limiting a user's security. In some examples, the systems described herein may improve the functionality of a user's computing device by increasing user security via creating and registering individual virtual tokens for each user account in the credential vault, thus preventing a stolen token on one online service from affecting security on another online service.

Figure 6:
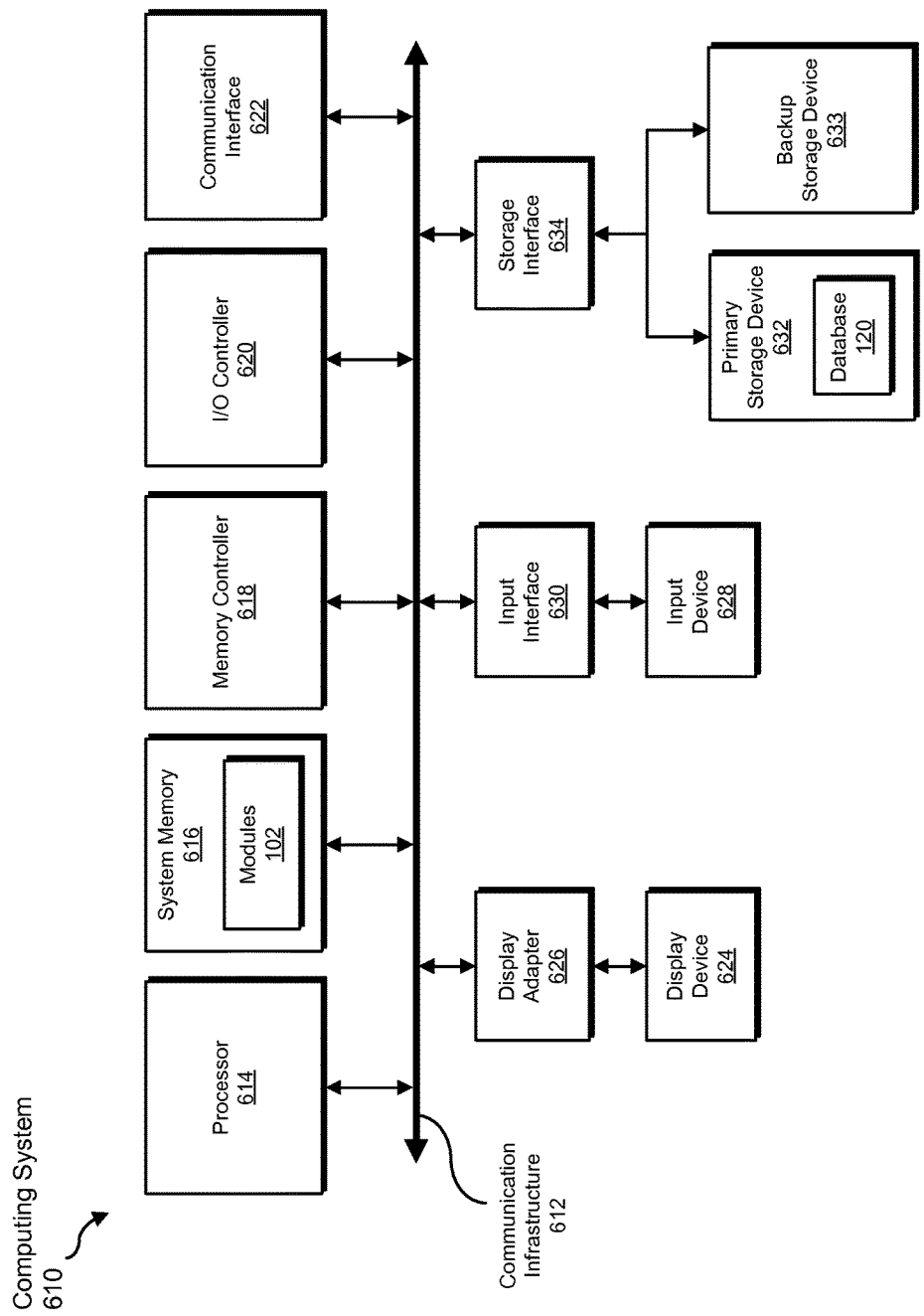
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
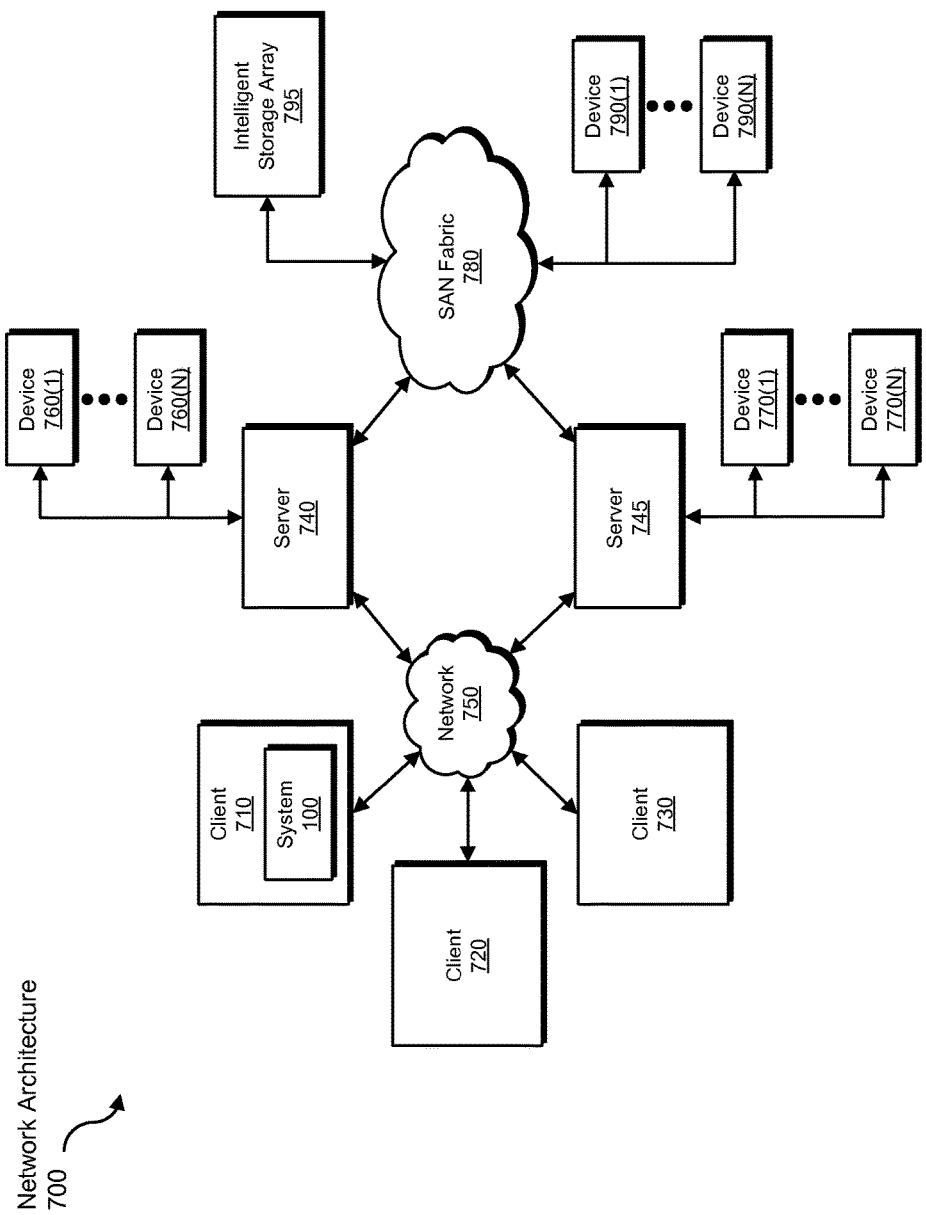
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for creating credential vaults that use multi-factor authentication to automatically authenticate users to online services.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive MFA authentication process data to be transformed, transform the MFA authentication process data into a virtual representation of a token, output a result of the transformation to a credential vault, use the result of the transformation to create and store credentials for a user, and store the result of the transformation to an account management system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for creating credential vaults that use multi-factor authentication to automatically authenticate users to online services, at least a portion of the method being performed by a computing device comprising at least one processor, the method comprising:
    detecting that a user is creating a user account that implements multi-factor authentication by crawling one or more websites that the user views for indications that the user is setting up an account that uses multi-factor authentication;
    identifying an existing predefined token that comprises a phone and that generates a cryptographic authentication code for multi-factor authentication for the user account to an online service at least in part by receiving a text message from the online service, wherein the text message indicates which type of token the online service is expecting;
    creating a customized virtual representation of the existing predefined token for the online service, customized according to the type of token indicated in the text message, wherein the customized virtual representation is created by a virtual machine instantiated on the computing device, the virtual machine being further configured to host a cryptographic code generation application that generates the cryptographic authentication code for the multi-factor authentication at least in part by receiving the text message;
    storing the virtual representation of the existing predefined token and a set of credentials for the user account in a credential vault for a user;
    sending a message to the online service that associates the virtual representation of the existing predefined token with the user account;
    authenticating the user to the credential vault in order to retrieve the virtual representation of the existing predefined token for the online service;
    retrieving, from the credential vault, the cryptographic authentication code generated by the virtual representation of the existing predefined token; and
    automating, based on the user being authenticated to the credential vault, at least one step of the multi-factor authentication process for the online service by providing the cryptographic authentication code generated by the virtual representation of the existing predefined token and the set of credentials to the online service from the credential vault such that the user does not have to use the existing predefined token to authenticate to the online service.

2. The computer-implemented method of claim 1, wherein creating the virtual representation of the existing predefined token comprises querying the online service about a type of the existing predefined token.

3. The computer-implemented method of claim 1, wherein the existing predefined token comprises an application designed to be executed on the phone.

4. The computer-implemented method of claim 1, wherein the credential vault is configured to store a plurality of sets of credentials and a plurality of virtual representations of existing predefined tokens for a plurality of online services.

5. The computer-implemented method of claim 4, further comprising:
    identifying an additional existing predefined token that generates an additional cryptographic authentication code for an additional multi-factor authentication for an additional user account to an additional online service;
    creating an additional virtual representation of the additional existing predefined token that is programmed to generate the additional cryptographic authentication code for the additional multi-factor authentication process;
    storing the additional virtual representation of the additional existing predefined token and an additional set of credentials for the additional user account in the credential vault for the user;
    sending an additional message to the additional online service that associates the additional virtual representation of the additional existing predefined token with the additional user account; and
    automating, based on the user being authenticated to the credential vault, the additional multi-factor authentication process for the additional online service by providing the additional cryptographic authentication code generated by the additional virtual representation of the existing predefined token and the additional set of credentials to the additional online service from the credential vault.

6. The computer-implemented method of claim 1, wherein the credential vault is stored on a remote server accessible from a plurality of computing devices operated by the user.

7. The computer-implemented method of claim 1, wherein authenticating the user to the credential vault comprises authenticating the user via a multi-factor authentication scheme.

8. The computer-implemented method of claim 1, wherein providing the online service with the cryptographic authentication code generated by the virtual representation of the existing predefined token and the set of credentials comprises automatically populating form fields on a website that uses the online service with the cryptographic authentication code and the set of credentials.

9. The computer-implemented method of claim 1, wherein the online service comprises a secure login service for multiple websites.

10. A system for creating credential vaults that automatically authenticate users to online services, the system comprising:
   a computer memory and at least one physical processor configured to execute:
   a detection module, stored in the memory, for detecting that a user is creating a user account that implements multi-factor authentication by crawling one or more websites that the user views for indications that the user is setting up an account that uses multi-factor authentication;
   an identification module, stored in the memory, for identifying an existing predefined token that comprises a phone that generates a cryptographic authentication code for multi-factor authentication for the user account to an online service at least in part by receiving a text message from the online service, wherein the text message indicates which type of token the online service is expecting;
   a creation module, stored in the memory, for creating a customized virtual representation of the existing predefined token for the online service, customized according to the type of token indicated in the text message, wherein the customized virtual representation is created by a virtual machine instantiated on the computing device, the virtual machine being further configured to host a cryptographic code generation application that generates the cryptographic authentication code for the multi-factor authentication at least in part by receiving the text message;
   a storing module, stored in the memory, for storing the virtual representation of the existing predefined token and a set of credentials for the user account in a credential vault for a user;
   a sending module, stored in the memory, for sending a message to the online service that associates the virtual representation of the existing predefined token with the user account;
   an authentication module, stored in the memory, for:
      authenticating the user to the credential vault in order to retrieve the virtual representation of the existing predefined token for the online service; and
      retrieving, from the credential vault, the cryptographic authentication code generated by the virtual representation of the existing predefined token; and
   an automation module, stored in the memory, for automating, based on the user being authenticated to the credential vault, at least one step of the multi-factor authentication process for the online service by providing the cryptographic authentication code generated by the virtual representation of the existing predefined token and the set of credentials to the online service from the credential vault such that the user does not have to use the existing predefined token to authenticate to the online service.

11. The system of claim 10, wherein the creation module is further configured for creating the virtual representation of the existing predefined token by selecting a virtual representation of the phone from a predetermined list of virtual representations of physical tokens.

12. The system of claim 10, wherein the existing predefined token comprises an application designed to be executed on the phone.

13. The system of claim 10, wherein the credential vault is configured to store a plurality of sets of credentials and a plurality of virtual representations of existing predefined tokens for a plurality of online services.

14. The system of claim 13, wherein:
   the identification module identifies an additional existing predefined token that generates an additional cryptographic authentication code for an additional multi-factor authentication for an additional user account to an additional online service;
   the creation module is further configured for creating an additional virtual representation of the additional existing predefined token that is programmed to generate the additional cryptographic authentication code for the additional multi-factor authentication process;
   the storing module is further configured for storing the additional virtual representation of the additional existing predefined token and an additional set of credentials for the additional user account in the credential vault for the user;
   the sending module is further configured for sending an additional message to the additional online service that associates the additional virtual representation of the additional existing predefined token with the additional user account; and
   the automation module is further configured for automating, based on the user being authenticated to the credential vault, the additional multi-factor authentication process for the additional online service by providing the additional cryptographic authentication code generated by the additional virtual representation of the existing predefined token and the additional set of credentials to the additional online service from the credential vault.

15. The system of claim 10, wherein the credential vault is stored on a remote server accessible from a plurality of computing devices operated by the user.

16. The system of claim 10, wherein the authentication module is further configured to authenticates the user to the credential vault by authenticating the user via a multi-factor authentication scheme.

17. The system of claim 10, wherein the automation module is further configured to provides the online service with the cryptographic authentication code generated by the virtual representation of the existing predefined token and the set of credentials by automatically populating form fields on a website that uses the online service with the cryptographic authentication code and the set of credentials.

18. The system of claim 10, wherein the online service comprises a secure login service for multiple websites.

19. A non-transitory computer-readable medium comprising one or more computer-readable instructions that, when executed by at least one processor of a computing device, cause the computing device to:
   detect that a user is creating a user account that implements multi-factor authentication by crawling one or more websites that the user views for indications that the user is setting up an account that uses multi-factor authentication;

identify an existing predefined token that comprises a phone and that generates a cryptographic authentication code for multi-factor authentication for the user account to an online service at least in part by receiving a text message from the online service, wherein the text message indicates which type of token the online service is expecting;

create a customized virtual representation of the existing predefined token for the online service, customized according to the type of token indicated in the text message, wherein the customized virtual representation is created by a virtual machine instantiated on the computing device, the virtual machine being further configured to host a cryptographic code generation application that generates the cryptographic authentication code for the multi-factor authentication at least in part by receiving the text message;

store the virtual representation of the existing predefined token and a set of credentials for the user account in a credential vault for a user;

send a message to the online service that associates the virtual representation of the existing predefined token with the user account;

authenticate the user to the credential vault in order to retrieve the virtual representation of the existing predefined token for the online service;

retrieve, from the credential vault, the cryptographic authentication code generated by the virtual representation of the existing predefined token; and automate, based on the user being authenticated to the credential vault, at least one step of the multi-factor authentication process for the online service by providing the cryptographic authentication code generated by the virtual representation of the existing predefined token and the set of credentials to the online service from the credential vault such that the user does not have to use the existing predefined token to authenticate to the online service.

20. The non-transitory computer-readable medium of claim 19, wherein the one or more computer-readable instructions cause the computing device to automate the at least one step of the multi-factor authentication process by providing the cryptographic authentication code generated by the virtual representation of the existing predefined token to the online service via an application programming interface.

* * * * *